(12) United States Patent
Yang

(10) Patent No.: US 7,999,508 B2
(45) Date of Patent: *Aug. 16, 2011

(54) UNIVERSAL BATTERY CHARGER

(75) Inventor: Fu-I Yang, Taoyuan (TW)

(73) Assignee: Samya Technology Co., Ltd., Taoyuan County (TW)

( * ) Notice: Subject to any disclaimer, the term of this patent is extended or adjusted under 35 U.S.C. 154(b) by 246 days.

This patent is subject to a terminal disclaimer.

(21) Appl. No.: 12/318,632

(22) Filed: Jan. 5, 2009

(65) Prior Publication Data

US 2010/0171462 A1 Jul. 8, 2010

(51) Int. Cl.
*H02J 7/00* (2006.01)
*H01M 2/00* (2006.01)
*H01R 12/00* (2006.01)

(52) U.S. Cl. ........ 320/114; 320/107; 320/110; 320/106; 320/125; 429/65; 429/66; 429/67; 439/68; 439/99; 439/100

(58) Field of Classification Search .................. 320/107, 320/114

See application file for complete search history.

(56) References Cited

U.S. PATENT DOCUMENTS

| | | | | |
|---|---|---|---|---|
| 5,162,719 A * | 11/1992 | Tomura et al. | ................ | 320/110 |
| 5,245,266 A * | 9/1993 | Yuen | ............................. | 320/110 |
| 5,256,954 A * | 10/1993 | Chen | ............................. | 320/110 |
| 5,357,185 A * | 10/1994 | Chen | ............................. | 320/110 |
| 5,619,116 A * | 4/1997 | Takano et al. | ................. | 320/116 |
| 5,679,017 A * | 10/1997 | Smith | ............................ | 439/172 |
| 6,285,159 B1* | 9/2001 | Ki et al. | ........................ | 320/112 |
| 2004/0195998 A1* | 10/2004 | Winkler | ........................ | 320/104 |
| 2004/0257034 A1* | 12/2004 | Moayer et al. | ................ | 320/107 |
| 2006/0049798 A1* | 3/2006 | Yang | ............................. | 320/112 |

* cited by examiner

*Primary Examiner* — Edward Tso
*Assistant Examiner* — Yalkew Fantu
(74) *Attorney, Agent, or Firm* — Rosenberg, Klein & Lee

(57) ABSTRACT

A universal battery charger including: a housing with a first locating surface; and a slide cover formed corresponding to the housing and having a second locating surface corresponding to and leaning against the first locating surface. The housing is provided with terminal pieces for adjusting the position. The terminal pieces may be moved by fingers from the bottom of the housing. The second locating surface of the slide cover is in tight contact with the first locating surface when the charger is not used, thereby creating a complete contour of the charger without any gaps. In charging, the slide cover is pushed outwards over a certain distance according to the dimensions of batteries such that a charging space is created between the second locating surface and the first locating surface of the housing. The push levers can be pushed by fingers from the bottom cover according to the charging interface of the battery such that the terminal pieces at the platform are moved to a proper position whereby an electric connection with the prearranged batteries is established for the charging purpose. As a result, the universal battery charger of the invention is suitable for all kinds of batteries. Moreover, a convenient adjustment and a practical use are achieved.

7 Claims, 7 Drawing Sheets

UNIVERSAL BATTERY CHARGER

BACKGROUND OF THE INVENTION

1. Field of the Invention

The invention relates to a universal battery charger, and more particularly to a universal battery charger that includes a slide cover positioned within the housing in a normal state. Meanwhile, the slide cover can be opened to create a charging groove in accordance with batteries in different types and dimensions. Moreover, the terminal pieces of the housing can be pushed by fingers from the bottom, thereby achieving a convenient operation.

2. Description of the Related Art

As new 3C products continue to be introduced to the market, their batteries must also have a variety of different specifications. For example, batteries currently used for SANYO's 3C products include many different specifications and types such as DBL40, DBL20, DBL30 and DBL10. Different batteries require corresponding chargers. However, this will cause inconvenience in use as well as difficulties in storage and carrying. In addition, a waste of cost will be caused, too.

Besides, it is also troublesome for the 3C products industry when a charger can be used for charging only one battery. There are many batteries of different specifications for a single SANYO product, thereby causing much trouble in stock management and cost problem. Therefore, how to integrate the charging of batteries of different specifications in a single charger without increasing its volume is the subject of the manufacturers.

In order to resolve the above-mentioned problems, an all-in-one charger is developed for batteries of different brands. As shown in FIG. 1, one or several combination charging grooves 91, 92 are provided for charging batteries having similar fixing way. Meanwhile, a charging terminal 93 is positioned at a place corresponding to the charging terminal of batteries B4~B7 such that they are in contact with each other for an electric connection. This all-in-one charger may have all kinds of charging grooves disposed in staggered way for making full use of its limited space. However, there are too many charging terminals 93, 94 and their configuration is too complicated. Moreover, the direction and the position for insertion of the batteries B4~B7 are different such that the user is easily confused in use. Moreover, the all-in-one charger is suitable for only few batteries. However, there are hundred kinds of batteries in the market. Besides, there are different types of Li/NiH-batteries. Furthermore, many new batteries are constantly developed. Therefore, it is a pity that the all-in-one charger is no more applicable after a short period.

SUMMARY OF THE INVENTION

An object of the invention is to eliminate the above-mentioned drawbacks and to provide a universal battery charger suitable for many kinds of secondary batteries with different brands and types. Moreover, the universal battery charger has a small volume and a wide application scope.

Another object of the invention is to provide a universal battery charger that is brought in a close position for a reliable precaution against the dust entrance when the charger is not used. In use, it is only required to push away the slide cover. Then, the charging terminal pieces are adjusted to a proper position with fingers. Therefore, a rapid alignment for the charging process is achieved. Moreover, a convenient adjustment and a practical use are ensured.

In order to achieve the above-mentioned object, a universal battery charger in accordance with the invention includes:

a) a housing having an L-shaped first locating surface in which a circuit board is provided at the front end thereof for the charging control, a platform perpendicular to the locating surface having a first slide slot in the longitudinal direction of X-X, a guide slot parallel to the first slide slot being positioned near both sides of the platform, respectively;

b) two conductive plates parallel to each other and disposed within the housing, the front end thereof is electrically connected to the circuit board;

c) two terminal-adjusting units each having a main body made by insulated material, a contact terminal made by a metal piece being symmetrically positioned at the left and right side thereof, the contact terminals establishing an electric connection with the corresponding conductive plates, a slider engaging into the first slide slot of the housing being disposed at the center of the terminal-adjusting units, a terminal piece extending from the slider being exposed at the platform, a push lever projecting at the opposite side of the slider;

d) a slide cover formed corresponding to the L-shaped housing and having a second locating surface corresponding to and leaning against the first locating surface. The slide cover further having a groove positioned at the center thereof and corresponding to the first slide slot, the slide cover further having a protrusion and a positioning piece at the both sides of the front end thereof such that a smooth movement of the slide cover on the platform is achieved and no disengagement takes place;

e) two springs each having a front end mounted within the head of the housing and a rear end mounted on the protrusion such that the springs constantly apply a resilient force to the first locating surface;

f) a bottom cover fixed on the bottom surface of the housing and having an arched groove at a position corresponding to the first slide slot of the housing, a second slide slot being positioned at the center of the arched groove, the push levers of the terminal-adjusting units passing through the second slide slot and jut out of the arched groove;

wherein the second locating surface of the slide cover is in tight contact with the first locating surface when the charger is not used, thereby creating a complete contour of the charger without any gaps;

wherein, in charging, the slide cover is pushed outwards over a certain distance according to the dimensions of batteries such that a charging space is created between the second locating surface and the first locating surface of the housing; and wherein the push levers can be pushed by fingers from the bottom cover according to the charging interface of the battery such that the terminal pieces at the platform are moved to a proper position, whereby an electric connection with the prearranged batteries is established for the charging purpose.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

Figure 3:
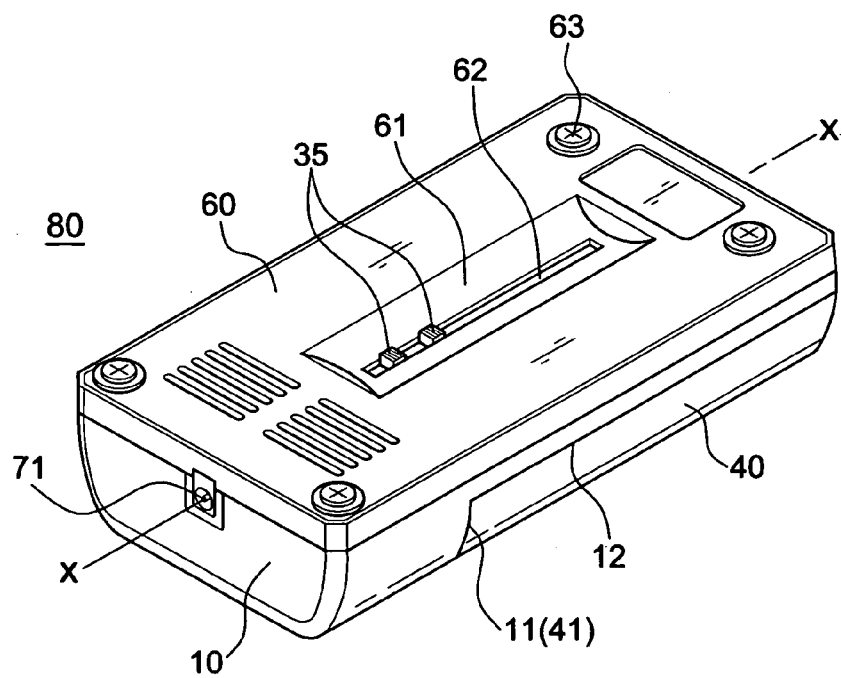
FIG. 3 is a perspective view of the rear side of a preferred embodiment of the universal battery charger in accordance with the invention.
Figure 4:
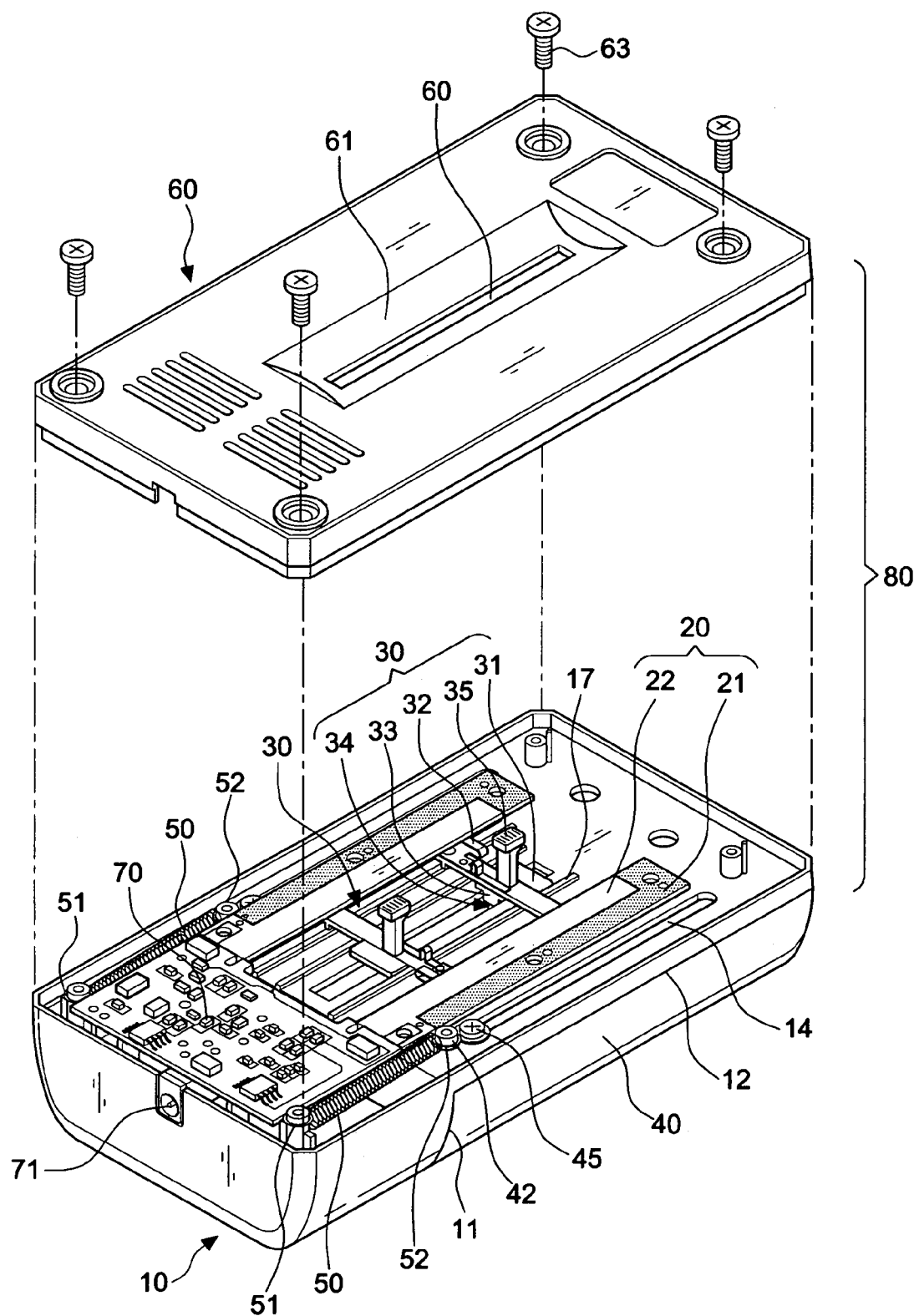
FIG. 4 is a partially exploded perspective view of the universal battery charger according to FIG. 3.

First of all, referring to FIGS. 3 and 4, a universal battery charger 80 in accordance with the invention includes a housing 10, two conductive plates 20, two terminal-adjusting units 30, a slide cover 40, two springs 50, and a bottom cover 60.

The housing 10 includes an L-shaped first locating surface 11 in which a circuit board 70 is provided at the front end thereof for the charging control. The circuit board 70 includes a power input interface 71. A platform 12 perpendicular to the locating surface 11 has a first slide slot 13 in the direction of X-X. A guide slot 14 parallel to the first slide slot 13 is positioned near both sides of the platform 12, respectively. Moreover, a plurality of rails 17 parallel to one another is positioned at both sides of the first slide slot 13.

The conductive plates 20 parallel to each other are disposed within the housing 10. The front end thereof is electrically connected to the circuit board 70. The conductive plates 20 each include a substrate 21 made by insulated material and a conductive piece 22 positioned on the substrate 21. The conductive pieces 22 are electrically coupled to the circuit board 70 for providing the power required by the charging process.

The terminal-adjusting units 30 each include a main body made by insulated material. A contact terminal 32 made by a metal piece is symmetrically positioned at the left and right side thereof. The contact terminals 32 are elastic and establish an electric connection with the corresponding conductive plates 20. In other words, the contact terminals 32 at the left and right sides are pushed against the conductive pieces 22 to create the electric contact. Moreover, a slider 33 engaging into the first slide slot 13 of the housing 10 is disposed at the center of the terminal-adjusting units 30. A terminal piece 34 extending from the slider 33 is exposed at the platform 12. Both of the terminal pieces 34 are electrically connected to the corresponding contact terminals 32 such that the terminal pieces 34 obtain the charging power. Meanwhile, a push lever 35 projects at the opposite side of the slider 33.

The slide cover 40 is formed corresponding to the L-shaped housing 10 and includes a second locating surface 41 corresponding to and leaning against the first locating surface 11. The slide cover 40 further includes a groove 42 positioned at the center thereof and corresponding to the first slide slot 13. The terminal pieces 34 move within the groove 42. The slide cover 40 includes a protrusion 43 at the both sides of the front end thereof, respectively. The protrusion 43 juts out into the guide slot 14. Besides, the slide cover 40 further includes positioning piece 44 adjacent to the protrusions 43.

Figure 5:
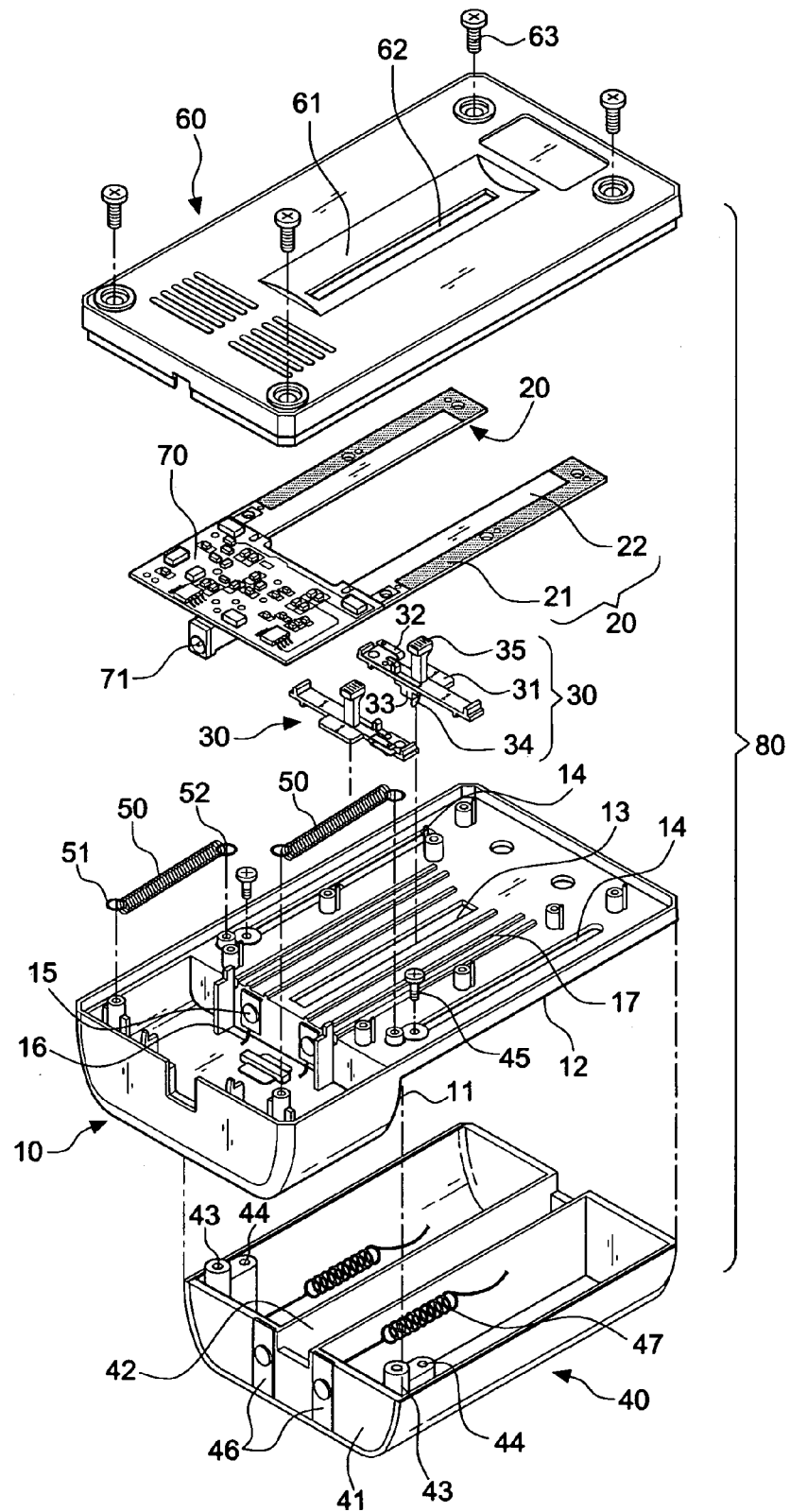
FIG. 5 is a further exploded perspective view of the universal battery charger according to FIG. 4.

The springs 50 each include a front end 51 mounted within the head of the housing 10 and a rear end 52 mounted at the top of the protrusion 43. In other words, the protrusion 43 juts out of the guide slot 14 for positioning the spring 50 such that the spring 50 constantly applies a resilient force to the first locating surface. As shown in FIGS. 4 and 5, two positioning elements 45 are tightened through the guide slots 14 into the positioning pieces 44 of the slide cover 40 such that the slide cover 40 won't be detached but is slidable on the platform 12. The positioning elements 45 can be screws but should not be limited thereto.

The bottom cover 60 is fixed on the bottom surface of the housing 10 with screws 63 and includes an arched groove 61 at a position corresponding to the first slide slot 13 of the housing 10. A second slide slot 62 is positioned at the center of the arched groove 61. The push levers 35 of the terminal-adjusting units 30 pass through the second slide slot 62 and jut out of the arched groove 61.

Figure 1:
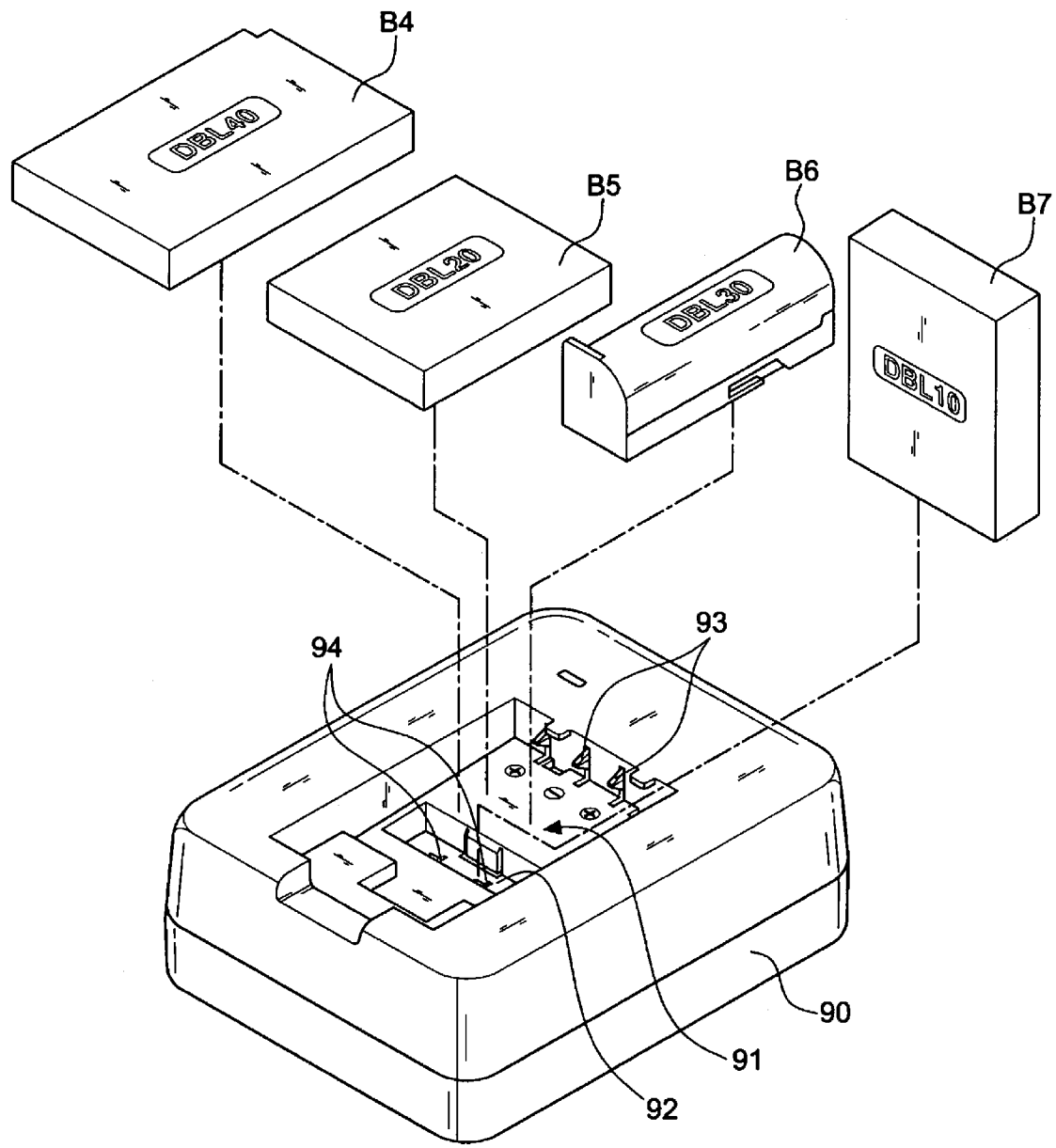
FIG. 1 is a perspective view of a conventional all-in-one charger.
Figure 2:
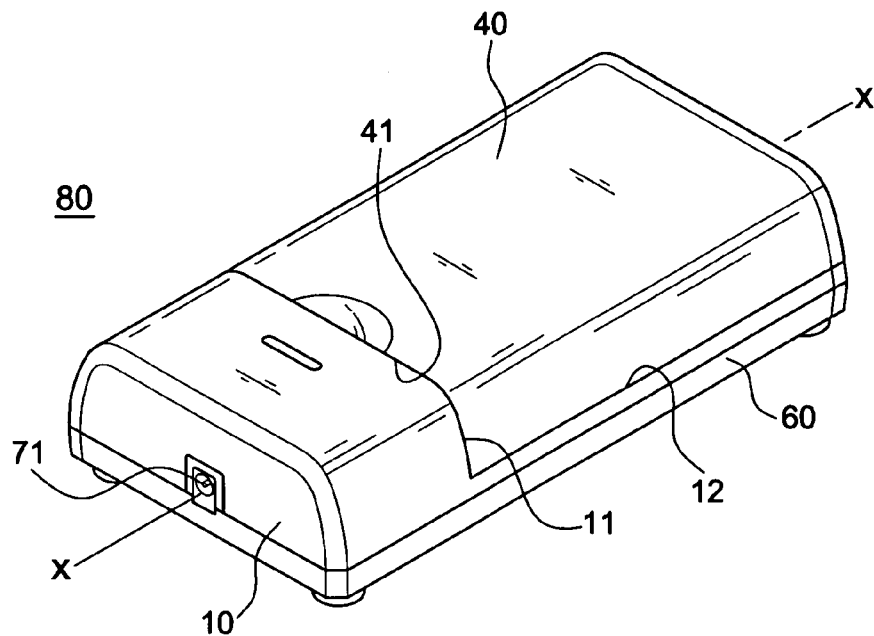
FIG. 2 is a perspective view of the front side of a preferred embodiment of the universal battery charger in accordance with the invention.
Figure 6:
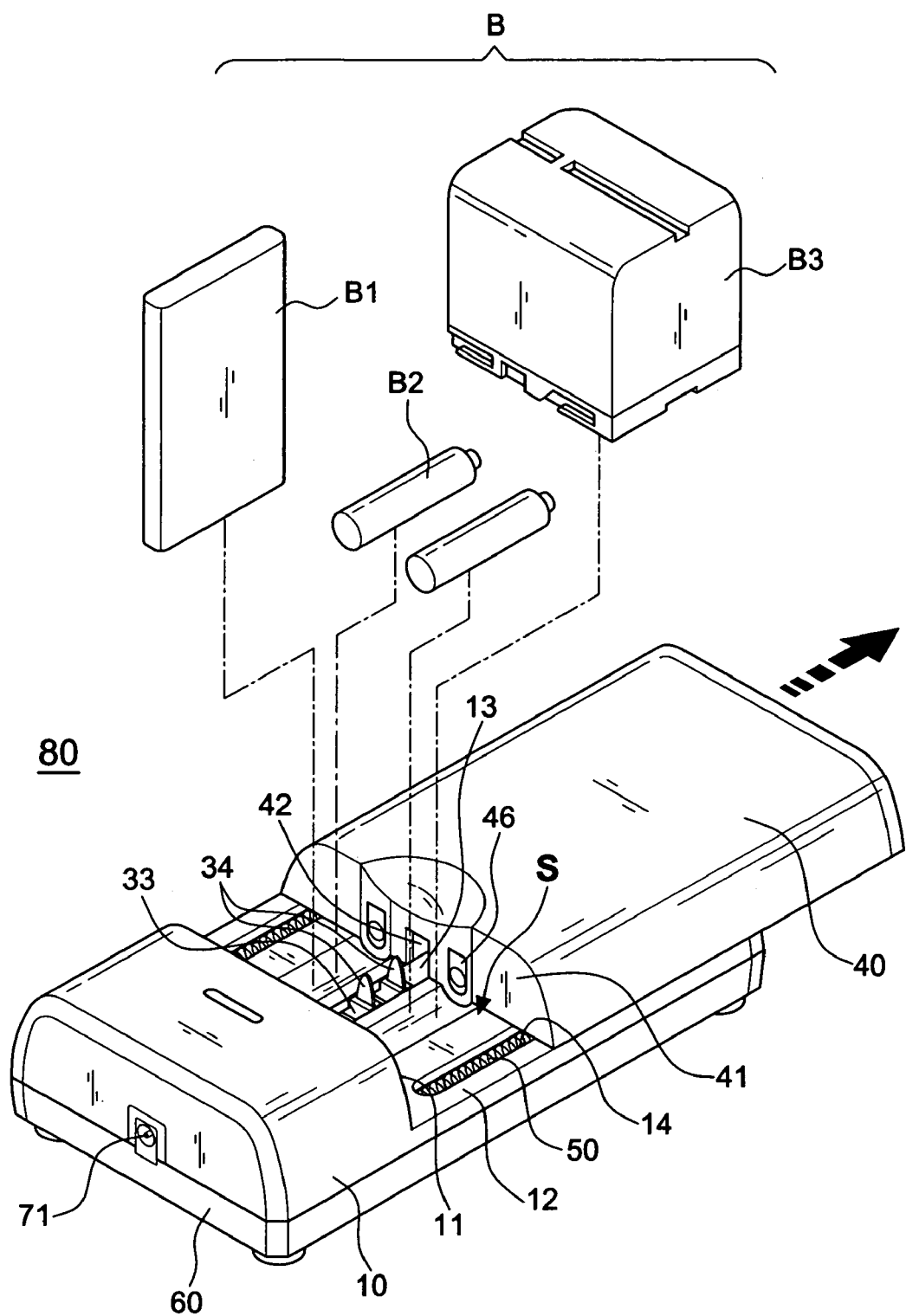
FIG. 6 is a perspective view of the universal battery charger in accordance with the invention, showing that the slide cover is pushed away.

Based on the assembly of the above-mentioned components, the second locating surface 41 of the slide cover 40 is in tight contact with the first locating surface 11 (see FIG. 2) when the charger 80 in accordance with the invention is not used. As a result, the charger 80 has a complete contour without any gaps such that a reliable precaution against the dust entrance is achieved. Moreover, a convenient charging process is also achieved. As shown in FIG. 6, the slide cover 40 is pushed outwards over a certain distance such that a charging space S is created between the second locating surface 41 and the first locating surface 11 of the housing 10. The push levers 35 can be pushed by fingers from the bottom cover 60 (see FIG. 3) such that the terminal pieces 34 at the platform 12 are moved to a proper position according to the charging interface of the battery B. In other words, the terminal piece 34 of the terminal-adjusting unit 30 is movable back and forth within the first slide slot 13 when the push lever 35 is pushed by the finger (see FIG. 6). As shown in FIG. 4, the contact terminal 32 of the terminal-adjusting unit 30 is constantly in electric contact with the conductive piece 22 of the conductive plate 20 no matter where it is moved. In this way, the terminal pieces 34 projecting at the platform 12 obtain the charging power delivered to the batteries B1~B3 for a successful charging process.

Figure 7:
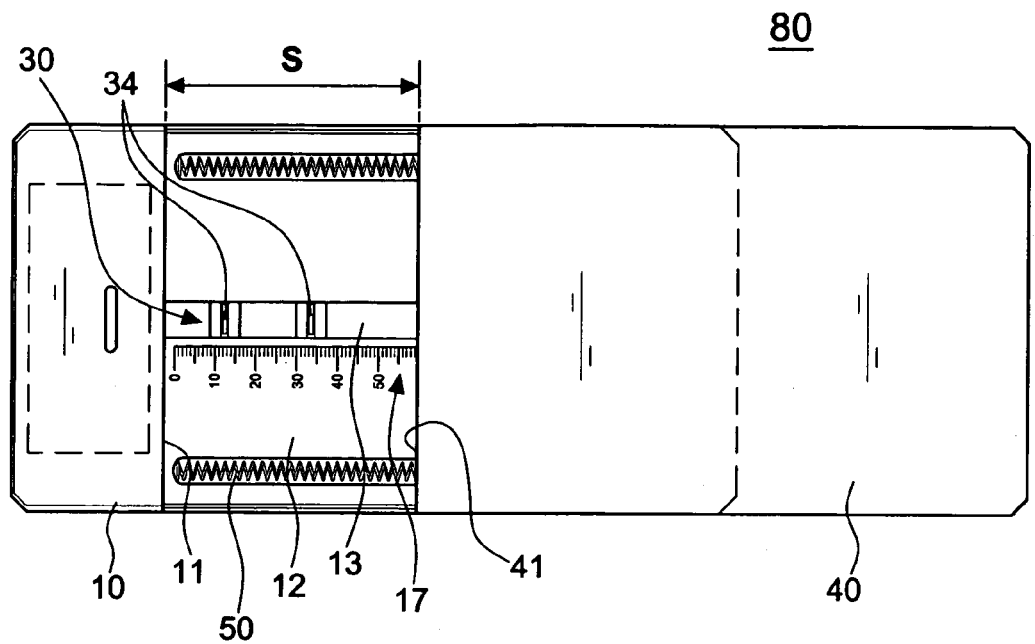
FIG. 7 is a top view of another embodiment of the universal battery charger in accordance with the invention.
Figure 8:
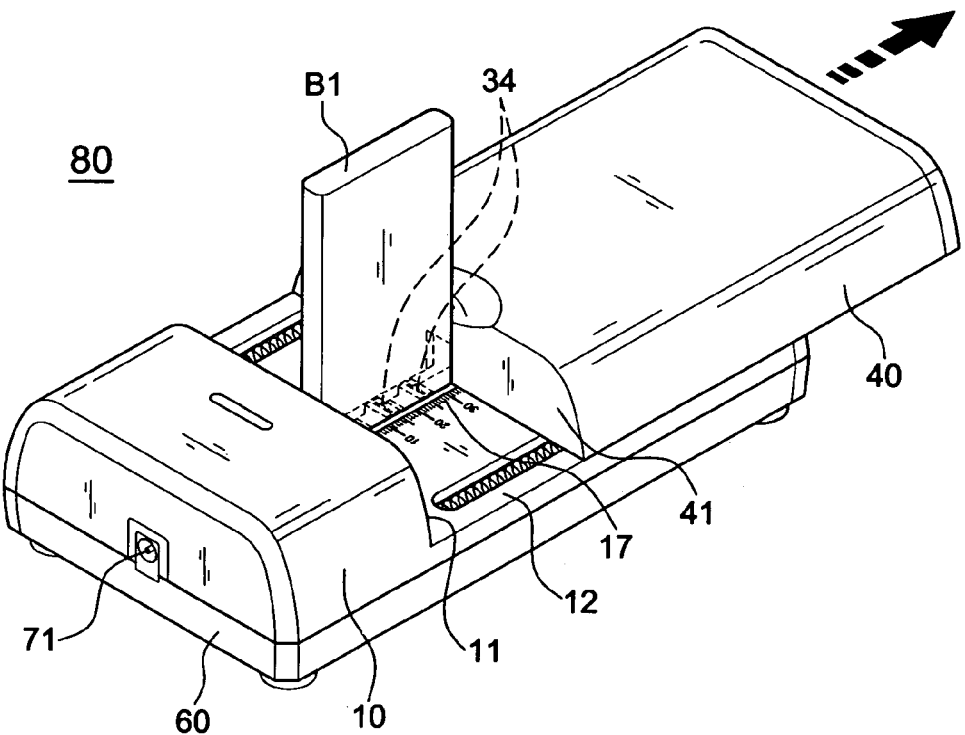
FIG. 8 is a perspective view of another embodiment of the universal battery charger in accordance with the invention.

FIGS. 7 and 8 illustrate another applicable embodiment of the invention. A numerical scale 17 is positioned at the side of the first slide slot 13 on the platform 12 of the housing 10. In this way, the terminal pieces 34 may be moved to a prearranged position according to the position of the charging terminal of the battery B1. In this way, a repeated alignment is avoided and a convenient use is ensured.

Figure 9:
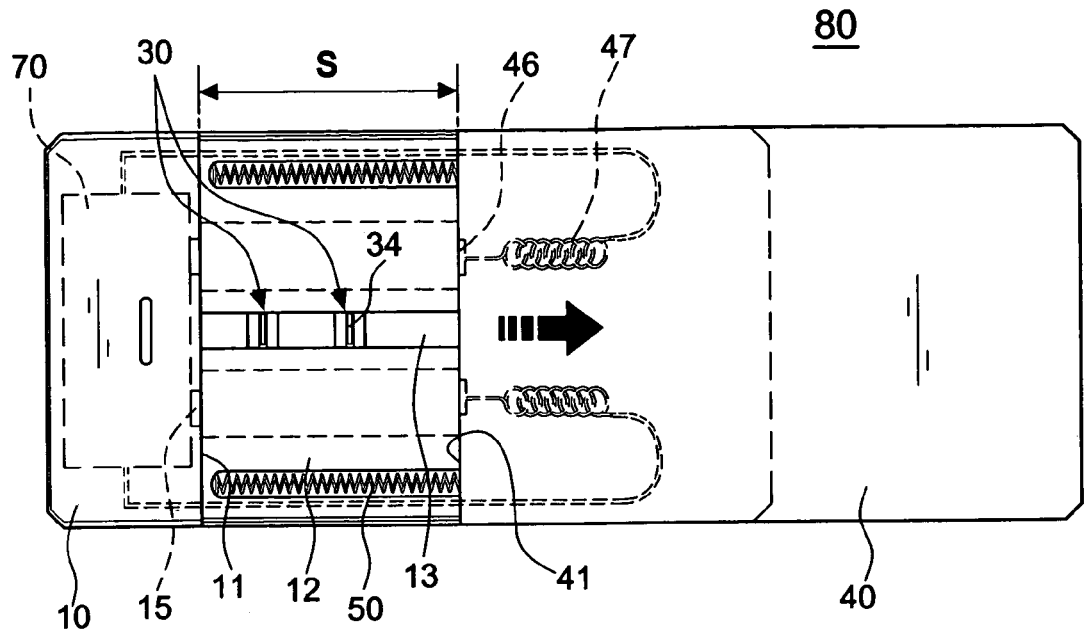
FIG. 9 is a top view of a further embodiment of the universal battery charger in accordance with the invention.
Figure 10:
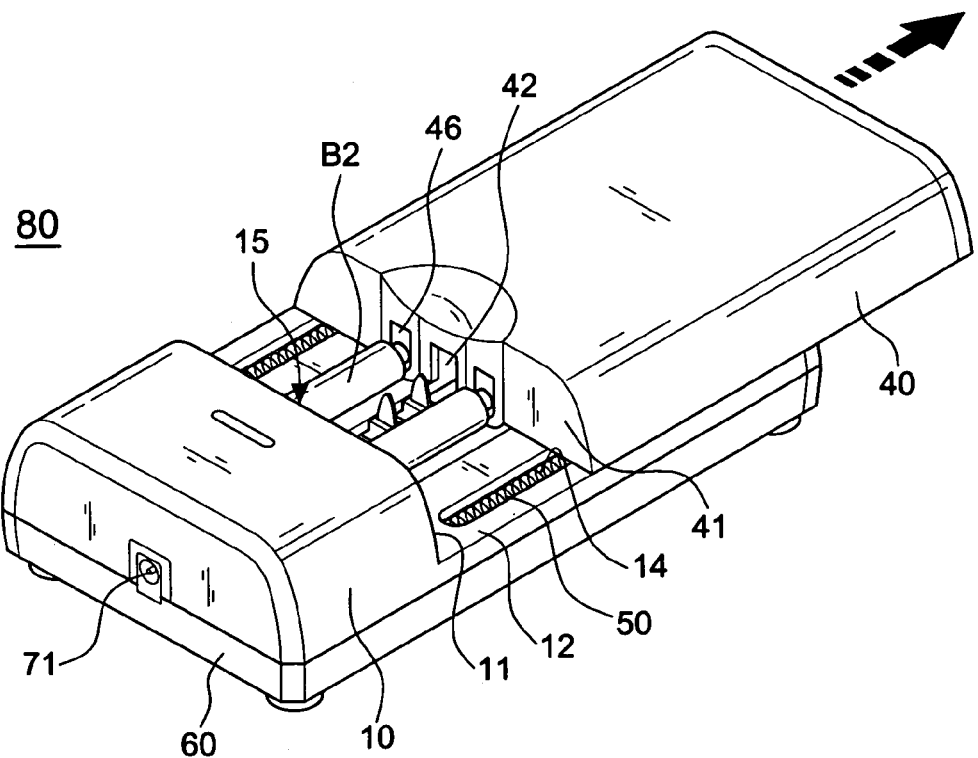
FIG. 10 is a perspective view of a further embodiment of the universal battery charger in accordance with the invention

FIGS. 9 and 10 illustrate a further applicable embodiment of the invention. Referring back to FIGS. 4 through 6, the first locating surface 11 of the housing 10 includes two first terminals 15 such as positive terminal while the second locating surface 41 of the slide cover 40 includes two second terminals 46 such as negative terminal. The terminals are coupled via conductive wires 16, 47 to the circuit board 70 for establishing a charging loop. In this way, a groove for charging the rechargeable NiH-batteries B2 such as batteries in the type of AA or AAA is created between the first and second locating surfaces 11, 41 by moving the slide cover 40 to a proper position. The second terminals 46 are movable so that the conductive wires 47 between the second terminals 46 and the circuit board 70 are correspondingly extendable. Thus, a practical mobility is achieved.

Unlike the conventional all-in-one chargers that are only suitable for charging few batteries, the charger 80 based on the above-mentioned configuration is suitable for all kinds of secondary batteries with different brands and types, including batteries that do not appear in the market yet. Moreover, the slide cover 40 is automatically moved to a close position for a reliable precaution against the dust entrance when the charger is not used. Therefore, the charging quality is ensured. In addition, a convenient adjustment of the charging terminal piece 34 is achieved so that the problems caused by the conventional charger are resolved.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A universal battery charger, comprising:
   a) a housing having an L-shaped first locating surface including a circuit board provided at a front end thereof for a charging control, a platform perpendicular to a locating surface having a first slide slot in the longitudinal direction of X-X, a guide slot parallel to the first slide slot being positioned near both sides of the platform, respectively;
   b) two conductive plates laterally displaced one from the other and disposed within the housing, the front end thereof electrically connected to the circuit board;
   c) two terminal-adjusting units each having a main body made by insulated material, a contact terminal made by a metal piece being symmetrically positioned at a left and right side thereof, the contact terminals establishing an electric connection with the corresponding conductive plates, a slider engaging into the first slide slot of the housing being disposed at a center of the terminal-adjusting units, a terminal piece extending from the slider being exposed at the platform, a push lever projecting at the opposite side of the slider;
   d) a slide cover formed corresponding to the L-shaped housing and having a second locating surface corresponding to and leaning against the first locating surface, the slide cover further having a groove positioned at the center thereof and corresponding to the first slide slot, the slide cover further having a protrusion and a positioning piece at the both sides of the front end thereof such that a smooth movement of the slide cover on the platform is achieved and no disengagement takes place;
   e) two springs each having a front end mounted within the head of the housing and a rear end mounted on the protrusion such that the springs constantly apply a resilient force to the first locating surface; and
   f) a bottom cover fixed on the bottom surface of the housing and having an arched groove at a position corresponding to the first slide slot of the housing, a second slide slot being positioned at the center of the arched groove, the push levers of the terminal-adjusting units passing through the second slide slot thereby jutting out of the arched groove, the push lever slidable to physically position the terminal pieces to electrically engage the charging interface of the battery during charging of said battery;
   wherein the second locating surface of the slide cover forms a substantially continuous contour with the first locating surface when the universal battery charger does not contain said battery therewithin;
   wherein, in charging, the slide cover is slidable to accommodate the battery to create a charging space between the second locating surface and the first locating surface of the housing.

2. The universal battery charger as recited in claim 1 wherein the bottom of the housing is provided with a plurality of rails parallel to one another and positioned at both sides of the first slide slot for a smooth movement of the terminal-adjusting units.

3. The universal battery charger as recited in claim 1 wherein the conductive plates each include a substrate made by insulated material and a conductive piece positioned on the substrate.

4. The universal battery charger as recited in claim 1 wherein a numerical scale is positioned at the side of the first slide slot on the platform of the housing.

5. The universal battery charger as recited in claim 1 wherein the first locating surface of the housing includes two first terminals while the second locating surface of the slide cover includes two second terminals, and wherein the terminals are coupled via conductive wires to the circuit board for establishing a charging loop such that a groove for charging the rechargeable NiH-batteries such as batteries in the type of AA or AAA is created between the first and second locating surfaces.

6. The universal battery charger as recited in claim 5 wherein the conductive wires between the second terminals and the circuit board are extendable.

7. The universal battery charger as recited in claim 1 wherein two positioning elements are tightened through the guide slots into the positioning pieces of the slide cover such that the slide cover won't be detached but is slidable.

* * * * *